United States Patent [19]

North

[11] Patent Number: 5,035,844
[45] Date of Patent: Jul. 30, 1991

[54] PROCESS FOR THE PRODUCTION OF MICROCAPSULES

[75] Inventor: Brian North, High Wycombe, England

[73] Assignee: The Wiggins Teape Group Limited, Hampshire, England

[21] Appl. No.: 341,817

[22] Filed: Apr. 24, 1989

[30] Foreign Application Priority Data

Apr. 23, 1988 [GB] United Kingdom ............... 8809648

[51] Int. Cl.$^5$ .................... B01J 13/10; B01J 13/20
[52] U.S. Cl. ................................ 264/4.33; 264/4.3; 428/402.2; 428/402.22; 503/214; 503/215
[58] Field of Search ................. 264/4.3, 4.33; 428/402.22

[56] References Cited

U.S. PATENT DOCUMENTS

| | | | |
|---|---|---|---|
| 3,041,289 | 6/1962 | Katchen et al. | 264/4.3 X |
| 3,510,435 | 5/1970 | Sirine | 264/4.3 X |
| 4,219,439 | 8/1980 | Miyake et al. | 264/4.4 |
| 4,222,891 | 9/1980 | Okimoto et al. | 264/4.4 |
| 4,394,287 | 7/1983 | Scarpelli | 264/4.32 |

FOREIGN PATENT DOCUMENTS

| | | |
|---|---|---|
| 1442175 | 7/1976 | United Kingdom . |
| 1483542 | 8/1977 | United Kingdom . |
| 1573361 | 8/1980 | United Kingdom . |

OTHER PUBLICATIONS

Chemical Abstracts, vol. 90, No. 18, Apr. 30, 1979, p. 437, abstract no. 144324 (of Japanese Laid-Open Patent Appln. No. 78-125273).
Research Disclosure, No. 162, Oct. 1977, "Microcapsules".

Primary Examiner—Richard D. Lovering
Attorney, Agent, or Firm—Burns, Doane, Swecker & Mathis

[57] ABSTRACT

In a process for the production of microcapsules by coavervation of gelatin, carboxymethyl cellulose (CMC) and a second anionic polymer such as a polyvinylmethylether/maleic anhydride copolymer or an ethylene/maleic anhydride/copolymer, the weight ratio of gelatin:CMC is chosen to be in the range 1:0.14 to 1:0.05, and the CMC used is chosen to have a viscosity in the range of from 50 to 140 mPas (cps), when measured in 6.0% by weight aqueous solution at 20° C. using a Brookfield RVT viscometer, Spindle No. 1, 10 r.p.m. The use of the specified weight ratio and CMC type permits significant increases in the solids content at which encapsulation can be carried out without increasing process viscosities to an unacceptable extent and/or giving rise to poor quality microcapsules. The process is particularly suitable for producing microcapsules for use in pressure-sensitive copying paper.

8 Claims, No Drawings

PROCESS FOR THE PRODUCTION OF MICROCAPSULES

This invention relates to the production of microcapsules by a complex coacervation process involving the use of three different colloids for microcapsule wall formation, namely gelatin, carboxymethylcellulose (CMC) and a second anionic polymer, for example a maleic anhydride copolymer such as vinyl methyl ether/maleic anhydride copolymer (PVMMA) or ethylene/maleic anhydride copolymer (EMA). The invention is particularly suited to the production of microcapsules for use in pressure-sensitive copying paper.

Complex coacervation processes involving the use of gelatin (an amphoteric colloid) and two anionic colloids are well known, and are described, for example, in British Patent No. 870476. Processes according to this patent have been widely commercialised for the production of microcapsules for use in pressure-sensitive copying paper (also known as carbonless copying paper or self-copying paper). As first commercialised, and as exemplified in the patent, the three colloids used were gelatin, and, as first and second anionic colloids, gum arabic and PVMMA respectively. However, reliable supplies of gum arabic of a purity and batch to batch consistency adequate for use in coacervation microencapsulation processes are hard to obtain, and even if obtainable, are expensive. As currently practised therefore, CMC is commonly used in place of gum arabic as the first anionic colloid. The CMC is normally used as its sodium salt.

PVMMA continues to be used as the second anionic colloid, although a variety of alternatives have been proposed, for example EMA or other similar maleic anhydride copolymers, or materials such as polyacrylic acid which have a chemical structure similar to maleic anhydride copolymers when the latter are hydrolysed in aqueous solution.

A conventional process of the kind outlined above will now be described in more detail, and by way of example, with reference to the manufacture of microcapsules for use in pressure-sensitive copying paper. A solution of chromogenic materials (also known as colour formers) in a solvent oil blend is first emulsified into an aqueous colloidal mixture of gelatin and PVMMA. CMC solution is then added, the CMC grade used typically having a viscosity in the range 150 to 250 mPas (cps) when measured as a 6.0% by weight aqueous solution at 20° C. using a Brookfield RVT viscometer Spindle No. 1., 10 r.p.m. The quantities of gelatin and CMC used are such that on a dry basis, the weight ratio of gelatin:CMC is typically about 1:0.3. The temperature is then raised and acetic acid is added to adjust the pH to about 4.2 and thereby bring about coacervation. The coacervate deposits about the emulsified oil droplets so as to form liquid-walled microcapsules. The mixture is then chilled to about 10° C. to solidify the initially-liquid coacervate walls, after which a hardening agent such as glutaraldehyde is added to cross-link the walls and prevent their re-dissolving when the temperature rises when the chilling operation is concluded. A further addition of PVMMA may then be made. The mixture is then normally adjusted to alkalinity (for example pH 10), typically with sodium hydroxide solution, and a preservative may be added. The microcapsule suspension so obtained may then be formulated with binders and other conventional additives to produce a paper coating composition. In a variant of the process, all or part of the PVMMA solution may be introduced with the CMC solution rather than being initially mixed with the gelatin solution.

Coacervation processes for the production of microcapsules have hitherto been regarded as being limited with respect to solids content, i.e. there is a maximum solids content at which they can be operated if good quality microcapsules are to be obtained and if viscosity is to stay at a workable level ("solids content" in this context refers to all the non-aqueous components present, rather than just to the dissolved solid material present, i.e. the weight of hydrophobic liquid to be encapsulated is taken into account). When coacervation processes for manufacturing microcapsules were first commercialised, the solids content employed was below 20%, but with increasing expertise and new material and process refinements, increases in solids contents have been achieved. With a three colloid process as described above, using gelatin, CMC and PVMMA as the colloids, a solids content of about 24% has hitherto been regarded as the effective upper solids content limit for a process operating on a production scale, although under special experimental conditions not readily reproducible continuously in a production environment, up to about a further 2 or 3% increase in solids content may be achievable.

It would clearly be advantageous to be able to operate a process of the kind described above at higher solids contents, as this would increase encapsulation plant capacity without capital expenditure, would reduce paper coating costs by reducing the amount of water to be removed by expensive drying, and would reduce transport costs where it is not feasible to pump microcapsule suspension from the microencapsulation plant direct to a paper coater where it is to be used (fewer road or rail tankers or drums would be needed). The use of higher solids contents also tends to improve the appearance of the finished microcapsule-coated paper, as there is relatively less water present and consequently a lower incidence of curl and cockle.

An obvious approach to the attainment of higher solids content is to use less water in the process, i.e. to add less dilution water or to use more concentrated colloid solutions. However, if this is done using the same raw materials and the same relative amounts of such materials as are conventionally used in commercial practice of the process described above, it has been found that substantial increases in viscosity result at certain stages of the process. These stages are principally the coacervation stage (as the pH passes through a value of about 4.5); the chilling stage (as the temperature passes through a temperature of about 20° C.); the further addition of PVMMA stage; and the final adjustment to alkalinity stage (as the pH passes through a pH of about 8.5 to 9.0).

Whilst it is possible to cope with these viscosity increases in a laboratory experiment and still make microcapsules, these increases would pose insuperable problems in production-scale equipment and processes. In the laboratory, a beaker is used as the coacervation vessel, and a simple laboratory stirrer is employed. Temperature control is achieved by means of a hotplate or water bath. The power of the stirrer is adequate to deal with mixes of quite high viscosities without the formation of "dead spots", i.e. regions of the coacervation vessel in which little or no mix circulation occurs.

By contrast, in production scale equipment, the coacervation vessel normally contains heat-exchange plates for temperature control, or baffles for other purposes, and these restrict the size of stirrer which can be employed and result in dead spots if the mix becomes too viscous (i.e. the stirrer agitates the mix in its immediate vicinity, but has little or no effect elsewhere). This uneven stirring effect also causes an excessively wide distribution of microcapsule diameters, and to a microcapsule emulsion containing very large clusters of microcapsules. As a result, the quality properties of the resulting microcapsules are impaired. High viscosities also add to energy costs in stirring, and in extreme cases can lead to electric motors becoming overloaded.

It has now been found that these viscosity increase problems may be reduced to an acceptable level, or even eliminated, whilst still permitting a significant increase in solids content to be achieved, if a lower viscosity grade of CMC and a smaller proportion of CMC relative to gelatin are used compared with those used hitherto. However, it has also been found that the CMC used must not have too low a viscosity, or else the resulting microcapsules are inadequate with regard to their ability to retain the encapsulation material and their stability with time. A further drawback is that the batch to batch reproducibility of microcapsule properties is adversely affected when such very low viscosity CMC is used.

Broadly, therefore, the invention resides in the use, in a process for the production of microcapsules by coacervation of gelatin with CMC and a second anionic colloid, of a CMC having a viscosity in the range of from 50 to 140 mPas (cps) (when measured in 6.0% by weight aqueous solution at 20° C. using a Brookfield RVT viscometer, Spindle No. 1 at 10 r.p.m.) and of a weight ratio of gelatin:CMC of from 1:0.14 to 1:0.05.

More particularly, the invention provides a process for the production of microcapsules by coacervation of gelatin with CMC and a second anionic colloid, comprising the steps of:

(a) forming an emulsion of a hydrophobic oil in an aqueous phase containing dissolved gelatin, CMC, and a second anionic polymer at a pH such that coacervation does not occur;

(b) acidifying the emulsion from step (a) to a pH such as to induce coacervation of the gelatin with the CMC and the second anionic polymer, with resultant deposition of liquid coacervate about the emulsified droplets of hydrophobic oil;

(c) chilling the acidified emulsion from step (b) so as to solidify the liquid coacervate and form solid-walled microcapsules each containing one or more droplets of hydrophobic oil; and (d) cross-linking the solid microcapsule walls by means of a chemical cross-linking or hardening agent so as to render the microcapsule walls permanent;

characterized in that the CMC used has a viscosity in the range of from 50 to 140 mPas (when measured in 6.0% by weight aqueous solution at 20° C. using a Brookfield RVT viscometer, Spindle No. 1, at 10 r.p.m.) and in that the weight ratio of gelatin:CMC is from 1:0.14 to 1:0.05.

The process is normally concluded by adjusting the pH to a neutral or alkaline value using sodium hydroxide or similar and adding a preservative such as formaldehyde and/or a proprietary preservative. Preferably a second addition of a solution of an anionic polymer such as PVMMA, EMA, or polyacrylic acid is made after the cross-linking step and prior to adjusting the pH to a neutral or alkaline value. This second addition of anionic polymer helps to contain the viscosity increases which tend to occur at this stage of a coacervation encapsulation process.

The emulsion of step (a) above may conveniently be formed by first emulsifying the hydrophobic oil into gelatin solution, and then adding CMC solution, with the solution of the second anionic colloid being added either to the gelatin solution before addition of the hydrophobic oil or after this addition (in the latter case, the second anionic colloid is added with the subsequently added CMC solution). Other variants are possible, e.g. addition of some of the solution of the second anionic colloid to the gelatin before the addition of hydrophobic oil, with the remainder of the solution of the second anionic colloid being added with the CMC solution. Alternatively the solution of the second anionic colloid could be added after the addition of hydrophobic oil but separately from the CMC solution. The important point is not the sequence of addition of the various constituents but the eventual formation of an emulsion of hydrophobic oil in an aqueous phase which contains dissolved gelatin, CMC and the second anionic colloid. It will be appreciated that the expression "dissolved" in this context embraces colloidal solutions or dispersions.

The acidification step (b) normally takes place some time after completion of the emulsion forming step (a), but in principle these two steps could be carried out in very rapid sequence or even virtually simultaneously.

It is important that the CMC used should be water-soluble. If the degree of substitution of the CMC is too low, e.g. about 0.5, it is hard to dissolve the CMC properly, and instead of a clear solution, a cloudy suspension results. It was found that if such a suspension is used in the present process, unacceptably high process viscosities were obtained, and the microcapules obtained were of poor quality, principally as regards their ability to retain the encapsulated hydrophobic oil. CMC grades with degrees of substitution from around 0.7 to around 1.3 have been satisfactorily used in the present process, but these values do not necessarily represent limiting values beyond which the process will not work.

For satisfactory results, the CMC should have a viscosity between the upper and lower thresholds identified above, i.e. between 50 and 140 mPas (measured as defined above). If the upper CMC viscosity threshold is exceeded, for example if the CMC used has a viscosity of 160 mPas or more (measured as defined above), it has been found that an excessive viscosity is produced during the encapsulation stage if solids contents above about 24 to 26% are attempted. This results in the production of capsules of too small size, and in stirring problems (it is difficult to stir the whole of the mix adequately, and there is substantially greater power consumption). Furthermore, an excessive viscosity affects the way in which the coacervate deposits around the oil droplet. This deposition tends to be uncontrolled, and hence there is a wide variability in capsule size (as well as a small average size as mentioned earlier). If a CMC is used having a viscosity below the lower critical threshold, for example a CMC having a viscosity of about 30 to 40 mPas (measured as defined above), it has been found that workable process viscosities may sometimes be obtained at high solids contents. However, it has also been found that the quality of the capsules formed is poor in relation to their ability to retain the hydrophobic oil fill (permeability) and their ability to retain fill material over prolonged periods without deterioration. Between the upper and lower viscosity thresholds, there is an increase in viscosity compared with the conventional system, but this is tolerable from the point of view of workability and power consumption etc. and good quality capsules are obtained.

The quality of the capsules produced by the present process is influenced to some extent by the bloom strength of the gelatin used, and this must be taken into account when practising the process. Thus when using a CMC of a viscosity towards the lower end of the specified range, for example 50 to 80 mPas (measured as defined above), gelatin of relatively high bloom strength should be used, for example 200 or more.

Although gelatins of a wide range of bloom strengths are usable in the present process, use of a gelatin of a bloom strength of about 160 is currently preferred. Similarly although CMC of a viscosity in the range 50 to 140 mPas is usable in the present process, use of a CMC of viscosity in the range 90 to 130 mPas is currently preferred (measured as defined above).

CMC as supplied commercially by manufacturers varies somewhat in viscosity from batch to batch, and manufacturers therefore normally specify a range within which the viscosity of a particular grade or brand of CMC will fall. This is a factor which must be taken into account when practising the present invention, i.e. reliance must be placed primarily on viscosity values as measured for a particular batch rather than on a nominal viscosity quoted by a manufacturer for a material supplied under a particular trade name.

As previously stated, the CMC viscosities quoted herein are as measured in 6.0% aqueous solution at 20° C. using a Brookfield RVT viscometer, Spindle No. 1, 10 r.p.m. One liter CMC solutions for these measurements were prepared by dissolving the requisite amount of CMC in the requisite amount of water in a two-liter beaker (making due allowance for the slight moisture content of the CMC as supplied by the CMC manufacturer). The water was stirred during the CMC addition by means of a four-bladed electric stirrer rotating at a speed of 750 r.p.m. Stirring was continued for a further two hours after the CMC addition whilst the solution equilibrated to 20° C. in a water bath. The viscosity measurement was made on completion of this further two hour stirring period, although any entrained air bubbles were allowed to clear first.

There are also upper and lower thresholds for the amount of CMC to be used relative to gelatin (0.14 and 0.05 part of CMC per part gelatin respectively). Conventionally, about 0.28 part of CMC per part gelatin is used, and so the amount used in the present process ranges from about half to a little above a sixth of that used conventionally. A marginally more preferred weight ratio of gelatin:CMC is from 1:0.14 to 1:0.06. Optimum quality microcapsules have so far been obtained at a gelatin:CMC weight ratio of about 1:0.07, and so this is the currently most preferred ratio.

The second anionic colloid should be of the kind previously proposed for use as the second anionic colloid in coacervation processes utilizing gelatin and two anionic colloids. Preferably, the second anionic colloid is PVMMA or EMA. Other maleic anhydride copolymers or chemically similar materials such as polyacrylic acid are in principle also usable.

When PVMMA is used, it should be of the kind conventionally used in three-colloid microencapsulation processes, for example "Sokolan CP2" supplied by BASF (now renamed "Lupasol") and of molecular weight about 70,000 or "Gantrez AN 903" supplied by GAF and of molecular weight about 20,000. The higher molecular weight PVMMA material has so far been found preferable, in that its use gave lower microencapsulation process viscosities than the lower molecular weight PVMMA.

The present process has been found to permit the production of microcapsules at solids contents of at least 30%, i.e. several per cent higher than in the conventional process as described earlier.

The nature of the hydrophobic oil will of course depend on the use to which the microcapsules are to be put. The major commercial use of microcapsules is in pressure-sensitive copying paper, and for this purpose the hydrophobic oil will contain dissolved chromogenic materials. The nature of hydrophobic oils and chromogenic materials for this purpose is widely disclosed in the patent and other literature, and so will not be described in detail herein. However, by way of example the hydrophobic oil may comprise one or more of the following solvents: partially hydrogenated terphenyls, alkyl naphthalenes, diarylmethane derivatives, dibenzyl benzene derivatives, alkyl benzenes and biphenyl derivatives. Any of these may be optionally mixed with diluents or extenders such as kerosene.

Also by way of example, the chromogenic material may comprise one or more of the following: phthalide derivatives, such as 3,3-bis(4-dimethylaminophenyl)-6-dimethylaminophthalide (CVL) and 3,3-bis(1-octyl-2-methylindol-3-yl)phthalide, or fluoran derivatives, such as 2'-anilino-6'-diethylamino-3'-methylfluoran, 6'-dimethylamino-2'-(N-ethyl-N-phenylamino-4'-methylfluoran), and 3'-chloro-6'-cyclohexylaminofluoran.

The invention will now be illustrated by the following examples, in which all percentages referred to are by weight and all measured viscosity values were obtained using a Brookfield RVT viscometer, Spindle No. 1, at the spindle rotational speed specified:

EXAMPLE 1

163.4 g of 160 bloom strength gelatin were added to 1749 g of de-ionized water and a small quantity of preservative was added to inhibit bacterial attack on the gelatin. The resulting solution was heated to 50° to 55° C. by means of a water bath, and the pH was adjusted to 6.5 using 25% sodium hydroxide solution. 1907.5 g of a solution of colour formers in a hydrophobic oil blend (the "internal phase") was then added to the gelatin solution under vigorous agitation using a Waring Blender. Agitation was continued until the desired oil droplet size was reached (this droplet size was slightly greater than 3 microns, as measured using a Coulter Counter). The resulting emulsion was termed the premix.

849.5 g of the premix were then diluted with 573.9 g de-ionized water and 28.3 g of a 5% solution of PVMMA ("Gantrez AN 903") were added, and the resulting mixture was heated to 50° to 55° C. A solution of 2.4 g of CMC in 151.1 g de-ionized water was then added. The CMC was of a type having a viscosity of 108 mPas when measured as a 6.0% aqueous solution at 20° C. and spindle speed 10 r.p.m.

The pH of the resulting mixture was then adjusted to 10.0 using 25% sodium hydroxide solution, after which 15% acetic acid solution was added slowly with stirring to adjust the pH to 4.2. The acetic acid addition had the effect of bringing about coacervation. Once coacervation appeared complete, the stirring speed was increased and the mixture was chilled to 10° C. 9.0 g of 50% glutaraldehyde solution were then added, and the mixture was left stirring for one hour. 29.7 g of 5% solution of the same type of PVMMA as was used earlier in the process were then added and the mixture was left stirring overnight. Next morning, 18.1 g of 10% sodium carbonate solution were added, and after holding for 5 minutes, the pH was adjusted to 10 with 25% sodium hydroxide solution 2 ml of 37% formaldehyde solution were then added as a preservative. The solids content of the final mix was approximately 30%.

The above described procedure (Run 1) was repeated three times. In the first repeat (Run 2), a different type of CMC was used, namely a CMC having a viscosity of 165 mPas (cps) in 6.0% aqueous solution at 20° C. In the third repeat (Run 3) the type of CMC used was as in Run 1, and in the fourth repeat (Run 4), the type of CMC used was as in Run 2. However, the amount of CMC used in each of Runs 3 and 4 was 9.6 g instead of the 2.4 g used in each of Runs 1 and 2. Thus the ratio of gelatin:CMC was 1:0.07 in Runs 1 and 2, and 1:0.28 in Runs 3 and 4.

It will be appreciated that Run 1 is according to the present invention, whereas Runs 2 to 4 are controls, differing from the invention by reason of the type of CMC used and/or amount of CMC used relative to gelatin.

The viscosity behaviour of the mix was observed closely during each Run. It was not possible to monitor the viscosity changes quantitatively, in view of the small size of vessel involved, but a good qualitative indication of viscosity behaviour was obtained by visual monitoring. At the end of each Run, the viscosity of the finished microcapsule batch was measured.

It was observed that the viscosity levels during the process were lowest for Run 1 (according to the invention), followed (in order of increasing viscosity) by Runs 2, 3 and 4 (not according to the invention). The measured viscosity values (spindle speed 100 r.p.m.) for the finished batches were as follows:

| Run No. | Viscosity (mPas) |
| --- | --- |
| 1 | 50.4 |
| 2 | 54.6 |
| 3 | 52.5 |
| 4 | 63.4 |

Whilst the above values were those measured in the case of the experiment described, it should be noted that there is considerable inherent batch to batch variability in encapsulation processes, and that a repeat experiment would not be expected to give exactly the same viscosity values.

The microcapsules obtained in each Run were then subjected to a variety of conventional tests as follows:

i) Calender Intensity Test (CI)

This provides an indication of the extent to which the internal phase has been successfully encapsulated. The test involved formulating the microcapsules into a conventional coating composition as used in pressure-sensitive copying paper and applying this composition by means of a laboratory coater to a sheet of base paper of the kind conventionally used in pressure-sensitive copying paper. A strip of the resulting coated paper was then placed, microcapsule-coated side down, on a strip of conventional colour developer as used in pressure-sensitive copying paper sets. The thus-superimposed strips were then passed through a laboratory calender to rupture the microcapsules and thereby produce a colour on the colour developing strip. The reflectance of this coloured strip was measured after 2 minutes development (I) and the result was expressed as a percentage of the reflectance of an unused control colour developing strip ($I_o$). This ratio ($I/I_o$) is termed the calender intensity (C.I.) value. The lower the C.I. value the more intense the colour and thus the more internal phase has been retained in the microcapsules. However, it should be noted that the C.I. value provides only an approximate indication of the extent to which colour former solution has been successfully retained (and therefore must be used with caution). This is because it is difficult to apply an adequately reproducible coatweight of microcapsules to the sheet by means of a laboratory coater. Coatweight variations will of course affect the C.I. value obtained. Nevertheless, the C.I. value provides a very useful indication of the extent to which the internal phase has been successfully encapsulated.

ii) Frictional Smudge Test

This provides an indication of the extent to which the microcapules are strong enough to withstand non-imaging pressures to which they may be subjected after manufacture (e.g. when the microcapsule-coated paper is tightly reeled up) or in use (e.g. when the microcapsule-coated paper is in a stack of similar paper or when other papers or objects are placed on top of the microcapsule-coated paper).

A sheet of microcapsule-coated paper was first produced as just described in relation to the C.I. test. A sheet of colour developing paper was placed on the microcapsule-coated paper, with the colour developing coating in contact with the microcapsule coating. A smooth metal cylinder (weighing about 3.6 kg) was placed on the uncoated surface of the colour developing sheet, and the sheet was pulled so as to slide over the surface of the microcapsule-coated paper, taking the weight with it. The effect of this was that some microcapsules were ruptured. The colour former solution released as a result produced a colour on contact with the colour developing sheet. The reflectance of this coloured area (I) was measured and the result was expressed as a percentage of the reflectance of an unused control colour developing strip ($I_0$). This ratio $I/I_o$) is termed the frictional smudge (F.S.) value. The higher the F.S. value, the less intense the colour and thus the fewer the number of ruptured microcapsules.

iii) Oven Age Decline Test

This simulates the effect of prolonged storage of microcapsule-coated paper before use and involves putting a sample of microcapsule-coated paper (prepared as decribed with reference to the C.I. test), in an oven at 150° C. for 45 minutes and then carrying out a C.I. test after allowing the paper to re-humidify for 1 hour in the laboratory. The difference between the C.I. value of the paper after the period of oven storage and the C.I. value of a further sample of the same paper which had not been subjected to oven storage is termed the Oven Age Decline (O.A.D.) value. A low O.A.D.

value indicates good microcapsules which do not decline with age.

iv) Permeability Test

This provides a measure of the ability of the microcapsules to retain the internal phase without leakage or volatilization.

A microcapsule-coated sheet was first prepared by the procedure described in relation to the C.I. test. A 7.5 cm (3 inch) square portion of the thus-coated sheet was steeped for 10 minutes in 20 ml of toluene at room temperature. This had the effect of extracting internal phase not retained within microcapsules having impermeable walls. The extracted material (in the toluene solution) was poured off and was developed by the addition of 5 ml stannic chloride solution. The resulting degree of colouration was determined colourimetrically after making up the volume to 50 ml by adding a 55/45 toluene/methylene blend and leaving for five minutes.

The same square portion of the microcapsule-coated sheet was then further extracted with 20 ml of a solution of methanol for 10 minutes (swirling occasionally) at room temperature. The colour of this further extract was developed with 5 ml stannic chloride solution and the volume was made up to 100 ml with methanol and the degree of colouration was determined colourimetrically. The further extraction with methanol had the effect of destroying the impermeability of the microcapsule walls and extracting all the colour former material present. The colouration produced in the toluene extract was expressed as a percentage of the colouration produced in the methanol extract. This ratio is termed the permeability value of the capsules. The lower the permeability value, the more impermeable (i.e. better) the microcapsules.

It was found that the results for each Run for all four tests were similar, and comparable to the values obtained for microcapsules as used in commercial production of pressure-sensitive copying paper, i.e. the capsules made by the process according to the invention were of satisfactory quality. There was a very slight lowering of the F.S. values for Runs 1 and 2 (gelatin:CMC ratio of 1:0.07) but this was not thought to be of practical significance.

EXAMPLE 2

This illustrates the use of the present invention on a pilot plant scale using a different brand of PVMMA ("Sokalan CP2") from that used in Example 1 ("Gantrez AN 903"), The procedure employed was generally as described in Example 1, except that the equipment and quantities of material used were larger, a Silverson in-line high shear mixer was used instead of a Waring blender, and heating was by means of a heating jacket rather than a water bath. The quantities of materials used were as follows:

| Premix | |
|---|---|
| Gelatin (160 bloom strength) | 4.0 kg |
| Water | 42.5 kg |
| Internal phase | 46.2 kg (53.0 litres) |
| Remaining stages of process | |
| Premix | All used |
| Dilution water | 48.5 kg |
| PVMMA solution (10%)—1st addition | 3.0 kg |
| CMC | 0.27 kg |
| Water for dissolving CMC | 21.0 kg |
| Glutaraldehyde (50%) | 1.0 kg |
| PVMMA solution (10%)—2nd addition | 3.2 kg |
| Sodium carbonate solution (10%) | 2.0 kg |

These quantities gave a solids content of approximately 30% and a gelatin:CMC ratio of 1:0.07.

The viscosity of the final microcapsule suspension was 58 mPas (spindle speed 100 r.p.m.)

The viscosity changes during the process were assessed visually by observing the extent of surface liquid movement. It was found that the process viscosities were somewhat higher than those encountered in a conventional low solids content process at about 23% solids content. Nevertheless the increase was judged to be small enough to be accommodated in commercial scale production and not such as to prevent satisfactory control of microcapsule diameter and microcapsule size distribution.

The microcapsules obtained were subject to C.I., F.S., O.A.D., and Permeability tests as described in Example 1, and the results obtained showed the microcapsules to be of comparable quality to those used conventionally in commercial production of pressure-sensitive copying paper. The tests were done in this case on samples of paper which had been coated on a pilot plant coater rather than a laboratory coater.

EXAMPLE 3

The procedure of Example 2 was repeated several times but using a different internal phase and a range of different amounts of 10% PVMMA solution for the first PVMMA addition rather than the 3.0 kg used in Example 1. These amounts ranged from 3.2 to 3.6 kg.

The previous viscosity behaviour and the results of the C.I., F.S., O.A.D., and Permeability tests were in each case as described in Example 2. As with Example 3, the tests were done on samples of paper which had been coated on a pilot plant coater.

EXAMPLE 4

The procedure of Example 2 was repeated using 5% PVMMA solution for both PVMMA additions. 7.6 kg of this solution was used for the first addition and 6.4 kg for the second addition.

The process viscosity behaviour and the results of the C.I., F.S., O.A.D., and permeability tests were as described in Example 2.

EXAMPLE 5

This illustrates the use of a range of different pH values (4.0 to 5.0) for inducing coacervation. The procedure employed was otherwise as in Example 1. No major effect on process viscosities or microcapsule properties was observed, but it was concluded that the optimum pH for inducing coacervation was in the region of pH 4.2 to 4.3.

EXAMPLE 6

This compares the use of a range of CMC grades of different viscosities and degrees of substitution. These were as follows (all viscosities were as measured in 6.0% aqueous solution at 20° C. and spindle speed 10 r.p.m).

| CMC Type | Viscosity (mPas) | Degree of Substitution |
| --- | --- | --- |
| A | 180 | 0.79 |
| B | 60 | 0.69 |
| C | 42 | 0.79 |
| D | 92 | 0.78 |

The procedure employed was generally as described in Example 1 except that the quantities of material used differed and the PVMMA used was as in Example 2. The quantities used were:

| Premix | |
| --- | --- |
| Gelatin (160 bloom strength) | 138.7 g |
| Water | 1474.1 g |
| Internal phase | 1637.1 g |

Two batches of premix were prepared, each using the above quantities of material and these batches were then combined.

| Remaining stages of process | |
| --- | --- |
| Premix | 5153.5 g |
| Dilution water | 2667.5 g |
| PVMMA solution (10%)—1st addition | 220.0 g |
| 1462 g of the above mixture was then used with each CMC type. | |
| CMC | 2.7 g |
| Water for dissolving CMC | 220.0 g |
| Glutaraldehyde (50%) | 10.0 g |
| PVMMA solution (10%)—2nd addition | 32.0 g |
| Sodium carbonate solution (10%) | 20.0 g |

These quantities gave a gelatin:CMC ratio of 1:0.07

The solids contents and viscosities of the resulting microcapsule mixes were measured (spindle speed 100 r.p.m.) and were as follows:

| CMC type | Solids Content (%) | Viscosity (mPas) |
| --- | --- | --- |
| A | 29.9 | 147 |
| B | 29.5 | 164 |
| C | 29.6 | 55 |
| D | 29.7 | 42 |

The microcapsule suspensions were then laboratory coated and tested as described in Example 1, and the results were as follows:

| CMC Type | C.I. (%) | F.S. (%) | O.A.D. (%) | Permeability % |
| --- | --- | --- | --- | --- |
| A | 44 | 73 | 5 | 3.9 |
| B | 41 | 68 | 13 | 10.6 |
| C | 43 | 68 | 12 | 9.8 |
| D | 45 | 74 | 5 | 4.1 |

It will be seen that the viscosity for CMC types A and B was very much higher than for types C and D. Whilst this difference is not necessarily significant at the end of the process, and could possibly be accounted for as being within the range of normal batch to batch variation, visual assessment during the process using CMC types A and B also indicated much higher viscosities than for CMC types C and D. It was concluded that these high viscosities would preclude the use of CMC types A and B in equipment of the size used in commercial production of microcapsules.

It will also be noted that CMC types B and C gave poorer permeability and O.A.D. values.

Thus the only CMC type which was satisfactory in all respects was type D. The supplier was Aqualon (UK) Ltd. of Warrington, United Kingdom, and the trade name was "Blanose 7L1C1".

CMC type B also had a viscosity within the range specified for the present process, but its use did not give satisfactory results in this instance. It is thought that this is because of the relatively low bloom strength gelatin used, and that satisfactory results could have been obtained with a higher bloom strength gelatin, for example as used in Example 11.

EXAMPLE 7

This compares the use of CMC type D as used in Example 6 with three further CMC types (E, F and G) and also again with type A from Example 6. CMC type F was of a kind conventionally used in making microcapsules using gelatin, CMC and PVMMA at a solids content of the order of 22% to 24%. The characteristics of these CMC types were as follows (all viscosities were as measured in 6.0% aqueous solution at 20° C. and spindle speed 10 r.p.m.):

| CMC Type | Viscosity (mPas) | Degree of Substitution |
| --- | --- | --- |
| A | 180 | 0.79 |
| D | 92 | 0.78 |
| E | 105 | 1.31 |
| F | 225 | 0.79 |
| G | 356 | 0.85 |

The procedure employed was generally as described in Example 1, except that the quantities of material used differed and the PVMMA used was as in Example 2.

Premix

Two batches of the following premix were made up:

| Gelatin (160 bloom strength) | 138.7 g |
| --- | --- |
| Water | 1474.1 g |
| Internal phase | 1637.1 g |

These two batches were then combined.

Remaining Stages of Process

The premix was then diluted with water and PVMMA solution was added, the quantities used being as follows:

| Premix | 3279.5 g |
| --- | --- |
| Dilution water | 1697.5 g |
| PVMMA solution (10%)—1st addition | 140 g |

1462 g of the above mixture was then used with each CMC type (a further batch of diluted premix and PVMMA solution was made up to provide sufficient material for use with all the different CMC types).

The quantities of the other materials used were as follows:

| CMC | 2.7 g |
| --- | --- |
| Water for dissolving CMC | 220 g |
| Glutaraldehyde (50%) | 10 g |
| PVMMA solution (10%)—2nd addition | 32 g |

| Sodium carbonate solution (10%) | 20 g |
|---|---|

These quantities gave a gelatin:CMC ratio of 1:0.07

The solids contents and viscosities of the resulting microcapsule mixes were measured (spindle speed 100 r.p.m.) and were as follows:

| CMC Type | Solids (Content %) | Viscosity (mPas) |
|---|---|---|
| A | 30.3 | 45 |
| D | 29.7 | 51 |
| E | 30.4 | 38 |
| F | 29.3 | 47 |
| G | 29.3 | 49 |

The microcapsule suspensions were then laboratory coated and tested as described in Example 1, and the results were as follows:

| CMC Type | C.I. (%) | F.S. (%) | O.A.D. (%) | Permeability (%) |
|---|---|---|---|---|
| A | 44 | 76 | 5.5 | 4.3 |
| D | 47 | 78 | 5.8 | 3.2 |
| E | 48 | 79 | 4.3 | 3.9 |
| F | 48 | 80 | 3.2 | 3.9 |
| G | 50 | 78 | 3.6 | 3.6 |

It will be seen that the viscosity of the finished microcapsule batches did not show the high values found in Example 6, even for CMC type A. However, visual assessment of the viscosity during the process showed that CMC types A, F and G all gave rise to unacceptably high viscosities. CMC types D and E i.e. the two types as defined in the present process, did not show these high viscosities.

The microcapsule properties obtained with all samples were satisfactory.

EXAMPLE 8

This illustrates the use of a further CMC type ("CMC type H") of which the viscosity of a 6.0% aqueous solution at 20° C. and spindle speed 10 r.p.m. was found to be 121 mPas (cps). Three different Runs were carried out, using different conventional internal phase formulations. 53.0 liters of internal phase were used in each Run, but because the density of the internal phases differed, the weights of internal phase used varied (47.2, 48.2 kg and 51.1 kg). In other respects, the procedure, materials and quantities used were as specified in Example 2 except that the amount of 10% PVMMA solution used in the first PVMMA addition was 3.47 kg. The viscosity behaviour observed was generally as in Example 2, and the microcapsule test results showed the microcapsules to be of comparable quality to those used conventionally in commercial production of pressure-sensitive copying paper.

EXAMPLE 9

This illustrates the use of gelatin of a range of different bloom strengths, namely 160 (as used in previous Examples), 200 and 233. The CMC used was as in Example 1. The procedure in each case was as described in Example 1 except that the following quantities of materials were used in place of those specified in Example 1:
80 g gelatin
850 g de-ionized water (for dissolving the gelatin)
956 g internal phase
1270 g premix
635 g de-ionized water (for diluting the premix)
46.9 g of 10% PVMMA solution ("Lupasol" supplied by BASF)
3.6 g CMC of viscosity 125 mPas measured as in Example 1, dissolved in 284 g de-ionized water
14 g of 50% glutaraldehyde solution
43 g of 10% PVMMA solution ("Lupasol")
27 g of 10% sodium carbonate solution
2.7 ml of 37% formaldehyde solution The viscosity behaviour of each mix was monitored visually throughout the encapsulation procedure, and was at an acceptably low level. The 233 bloom strength gelatin batch had the lowest viscosity, followed by the 200 bloom strength gelatin batch and then the 160 bloom strength gelatin batch. The solids contents and viscosities of the finished microcapsule batches were as follows (spindle speed 100 r.p.m.):

| Gelatin Bloom Strength | Solids Content (%) | Viscosity (mPas) |
|---|---|---|
| 160 | 31 | 51 |
| 200 | 31 | 55 |
| 233 | 30 | 40 |

The microcapsule suspensions obtained were laboratory coated and tested as described in Example 1, and the results were as follows:

| Gelatin Bloom Strength | C.I. (%) | F.S. (%) | O.A.D. (%) | Permeability (%) |
|---|---|---|---|---|
| 160 | 46 | 82 | 6.0 | 3.1 |
| 200 | 46 | 81 | 5.5 | 2.6 |
| 233 | 47 | 82 | 6.4 | 2.3 |

It will be seen that the microcapsules obtained were all of satisfactory quality.

EXAMPLE 10

This illustrates the use of a low bloom strength gelatin (122 bloom strength, derived from a 50/50 weight blend of 102 and 142 bloom strength gelatins), and, by way of comparison, the use of gelatins of 160 and 200 bloom strength as used in previous Examples. The procedure in each case was as described in Example 1 except that the following quantities and types of materials were used in place of those specified in Example 1:
40 g gelatin
425 g de-ionized water (for dissolving the gelatin)
478.1 g internal phase
944 g premix
485 g de-ionized water (for diluting the premix)
35 g of 10% PVMMA solution ("Lupasol" supplied by BASF)
2.7 g CMC of viscosity 125 mPas measured as in Example 1, dissolved in 210 g de-ionized water
10 g of 50% glutaraldehyde solution
32 g of 10% PVMMA solution ("Lupasol")
20 g of 10% sodium carbonate solution The viscosity behaviour of each mix was monitored visually throughout the encapsulation procedure, and was judged acceptably low in each case. The batch prepared with 122 bloom strength gelatin had the lowest process viscosity, but its final viscosity was similar to that of the 160 bloom gelatin batch. The viscosity of the 200 bloom gelatin batch was rather higher than the other two batches during the coacervation and chilling stages and increased fairly sharply during the second PVMMA addition before falling again. In all cases, however, these viscosity increases were judged to be of a tolerable level and to be accommodatable in a commercial production-scale process. The solids contents and viscosities of the finished microcapsule batches were as follows (spindle speed 100 r.p.m.):

| Gelatin Bloom Strength | Solids Content (%) | Viscosity (mPas) |
| --- | --- | --- |
| 122 | 30 | 45 |
| 160 | 30 | 53 |
| 200 | 31 | 91 |

The microcapsules suspensions obtained were laboratory coated and tested as described in Example 1 and the results were as follows:

| Gelatin Bloom strength | C.I. (%) | F.S. (%) | O.A.D. (%) | Permeability (%) |
| --- | --- | --- | --- | --- |
| 122 | 50 | 81 | 2 | 4.0 |
| 160 | 48 | 78 | 3 | 4.3 |
| 200 | 48 | 80 | 3 | 4.9 |

It will be seen that the microcapsules obtained were all of satisfactory quality.

EXAMPLE 11

This illustrates that the use of a high bloom strength gelatin permits satisfactory use of a relatively low viscosity CMC.

The gelatin used had a bloom strength of 256 and five different types of CMC were used, as follows:

| CMC Type | Viscosity (mPas)* |
| --- | --- |
| I | 39 |
| J | 19 |
| K | 57 |
| L | 51 |
| M | 125 |

*All viscosities were measured as a 6.0% aqueous solution at 20° C. and spindle speed 10 rpm.

The procedure in each case was as in Example 10, except that the following changes were made to the quantities of materials used:
110 g gelatin
1169 g de-ionized water (for dissolving the gelatin)
1314.2 g internal phase
943 g premix
34.7 g of 10% PVMMA solution ("Lupasol" supplied by BASF)

The CMC was used in the manner and quantities specified in Example 10, but was of types I to M detailed above.

The viscosity behaviour of each mix was monitored visually throughout the encapsulation procedure, and was judged acceptably low in each case. The batch prepared with type M CMC had the lowest processing viscosity. The viscosities of the batches prepared with types I, J and K CMC all increased fairly sharply, compared with the type M batch, during the second PVMMA addition before falling again, and in the case of the batch with type K, there was also a slight increase during the chilling stage, again compared with the type M batch. In all cases however, these increases were judged to be of a tolerable level and to be accommodatable in a production-scale process. The solids contents and viscosities of the finished microcapsule batches were as follows (spindle speed 100 r.p.m.):

| CMC Type | Solids Content (%) | Viscosity (mPas) |
| --- | --- | --- |
| I | 31 | 128 |
| J | 32 | 82 |
| K | 31 | 63 |
| L | 31 | 72 |
| M | 31 | 74 |

The microcapsule suspensions obtained were laboratory coated and tested as described in Example 1, and the results were as follows:

| CMC Type | C.I. (%) | F.S. (%) | O.A.D. (%) | Permeability (%) |
| --- | --- | --- | --- | --- |
| I | 44 | 76 | 10.5 | 8.7 |
| J | 46 | 77 | 10.5 | 9.6 |
| K | 47 | 77 | 6.9 | 4.7 |
| L | 44 | 77 | 6.1 | 4.8 |
| M | 47 | 78 | 4.1 | 4.9 |

It will be seen that the O.A.D. and permeability results for CMC types I and J (viscosities below 50 mPas) were poor, indicating microcapsules of unacceptable quality, whereas the results for CMC types K, L and M (viscosities above 50 mPas) show that the microcapsules obtained were of good quality.

EXAMPLE 12

This illustrates the use of a range of different gelatin:CMC ratios, as follows:

| Run No. | Gelatin:CMC ratio |
| --- | --- |
| 1 | 1:0.07 (i.e. as previous Examples) |
| 2 | 1:0.035 |
| 3 | 1:0.06 |
| 4 | 1:0.105 |
| 5 | 1:0.14 |

The procedure in each case was as in Example 10, except that the following changes were made to the quantities and types of materials used:
80 g gelatin
850 g de-ionized water (for dissolving the gelatin)
956.1 g internal phase
1274.1 g premix
635 g de-ionized water (for diluting the premix)
46.9 g of 10% PVMMA solution
X g CMC of viscosity 108 mPas measured as in Example 1, dissolved in 284 g de-ionized water (Run 1, X=3.6; Run 2, X=1.8; Run 3, X=3.1; Run 4, X=5.4; Run 5, X=7.2)
14 g of 50% glutaraldehyde solution
43 g of 10% PVMMA solution ("Lupasol")
27 g of 10% sodium carbonate solution The viscosity behaviour of each mix was monitored visually throughout the encapsulation procedure. The lowest viscosity obtained during the process was from Run 2, and a clear trend emerged, with process viscosity increasing as the amount of CMC increased. In all cases however, the viscosity was judged to be acceptably low for use of the process in a commercial production-scale process. The solids contents and viscosities of the finished microcapsule batches were as follows (spindle speed 100 r.p.m.):

| Run No. | Solids Content (%) | Viscosity (mPas) |
| --- | --- | --- |
| 1 | 30 | 65 |
| 2 | 30 | 98 |
| 3 | 30 | 64 |
| 4 | 30 | 54 |
| 5 | 30 | 74 |

It will be seen that the viscosities of the finished batches did not follow the trend observed during the stages of the microencapsulation process itself.

The microcapsule suspensions obtained were laboratory coated and tested as described in Example 1, and the results were as follows:

| Run No. | C.I. (%) | F.S. (%) | O.A.D. (%) | Permeability (%) |
| --- | --- | --- | --- | --- |
| 1 | 45 | 76 | 7.1 | 4.1 |
| 2 | 46 | 77 | 10.3 | 7.1 |
| 3 | 48 | 78 | 7.3 | 4.4 |
| 4 | 41 | 76 | 6.7 | 4.7 |
| 5 | 42 | 78 | 6.7 | 4.0 |

It will be seen that the O.A.D. and permeability results for Run 2 (gelatin:CMC ratio of 1:0.035) were poor, indicating microcapsules of unacceptable quality, whereas the results for the remaining Runs showed that the microcapsules obtained were of good quality.

Attempts to produce microcapsules with 0.17 or more parts of CMC per part gelatin were unsuccessful, as the mixes became very viscous or gelled, and to the extent microcapsules could be obtained at all, they were of poor quality.

EXAMPLE 13

This illustrates the use of a further range of different gelatin:CMC ratios, as follows:

| Run No. | Gelatin:CMC ratio |
| --- | --- |
| 1 | 1:0.07 (i.e. as previous Examples) |
| 2 | 1:0.05 |
| 3 | 1:0.04 |

The procedure in each case was as in Example 12 except that the following changes were made to the quantities and types of materials used:
140 g gelatin
1487.5 g de-ionized water (for dissolving the gelatin)
1673.2 g internal phase
CMC quantities: Run 1, 3.6 g; Run 2, 2.6 g; Run 3, 2.0 g.

The viscosity behaviour of each mix was monitored visually throughout the encapsulation procedure. A clear trend emerged, with process viscosity decreasing as the proportion of CMC to gelatin decreased. In all cases however, the viscosity was judged to be acceptably low for use of the process in a commercial production-scale process. The solids contents and viscosities of the finished microcapsule batches were as follows (spindle speed 100 r.p.m.):

| Run No. | Solids Content (%) | Viscosity (mPas) |
| --- | --- | --- |
| 1 | 31 | 51 |
| 2 | 31 | 51 |
| 3 | 29 | 52 |

The microcapsule suspensions obtained were laboratory coated and tested as described in Example 1, and the results were as follows:

| Run No. | C.I. (%) | F.S. (%) | O.A.D. (%) | Permeability (%) |
| --- | --- | --- | --- | --- |
| 1 | 46 | 72 | 6.1 | 4.6 |
| 2 | 44 | 76 | 4.8 | 3.5 |
| 3 | 44 | 70 | 8.3 | 7.6 |

It will be seen that the O.A.D. and permeability results for Run 3 (gelatin:CMC ratio of 1:0.04) were poor, indicating microcapsules of unacceptable quality, whereas the results for the remaining Runs showed that the microcapsules obtained were of acceptable quality.

EXAMPLE 14

This illustrates the use of EMA as the second anionic colloid (in place of the PVMMA used in previous Examples).

The procedure was as in Example 1, except that the following changes were made to the quantities and types of materials used:
75.4 g gelatin
801.7 g de-ionized water (for dissolving the gelatin)
902 g internal phase
1779 g premix
912 g de-ionized water (for diluting the premix)
65.5 g of 10% EMA solution ("EMA 21" supplied by Monsanto) in place of PVMMA solution
5.03 g CMC of viscosity 125 mPas measured as in Example 1, dissolved in 396.7 g de-ionized water
19.5 g of 50% glutaraldehyde solution
60 g of 10% EMA solution as above, in place of PVMMA solution
37.7 g of 10% sodium carbonate solution The viscosity behaviour of the mix was monitored visually, and was found to be comparable to that obtainable when PVMMA is used. The solids content and viscosity (spindle speed 100 r.p.m.) of the final microcapsule suspension were 31% and 60 mPas respectively. The microcapsule suspension was then laboratory coated and tested as described in Example 1. The results obtained were: C.I. 46%; F.S. 77%; O.A.D. 6.3%; and permeability 4.7%. These results are indicative of microcapsules of satisfactory quality.

EXAMPLE 15

This illustrates the use of EMA, polyacrylic acid and a different brand of PVMMA as alternatives to the PVMMA added in previous Examples after the addition of glutaraldehyde hardening agent.

The procedure in each case was as described in Example 11 except that 32 g of 10% solution of the following materials were used in place of the PVMMA solution added in that Example after the addition of glutaraldehyde:
EMA ("EMA 21" supplied by Monsanto)

Polyacrylic acid ("Versicol E11" supplied by Allied Colloids)
PVMMA ("DS 1935" supplied by GAF)

The viscosity behaviour of each mix was monitored visually throughout the encapsulation procedure. The batches with EMA and polyacrylic acid showed viscosities on the high side, but these were judged to be just acceptable. No viscosity problem was experienced with the PVMMA batch. The solids contents and viscosities (spindle speed 100 r.p.m.) of the finished microcapsule batches were as follows:

| Polymer | Solids Content (%) | Viscosity (mPas) |
| --- | --- | --- |
| EMA | 32 | 55 |
| Polyacrylic acid | 33 | 68 |
| PVMMA | 31 | 90 |

The microcapsule suspensions obtained were laboratory coated and tested as described in Example 1, and the results were as follows:

| Polymer | C.I. (%) | F.S. (%) | O.A.D. (%) | Permeability (%) |
| --- | --- | --- | --- | --- |
| EMA | 45 | 68 | 6.7 | 3.9 |
| Polyacrylic acid | 47 | 74 | 8.6 | 4.2 |
| PVMMA | 50 | 78 | 3.2 | 3.4 |

It will be seen that the microcapsules obtained were all of satisfactory quality.

I claim:

1. A process for the production of microcapsules by coacervation of gelatin with carboxymethylcellulose (CMC) and a second anionic colloid, comprising the steps of:
   (a) forming an emulsion of a hydrophobic oil in an aqueous phase containing dissolved gelatin, CMC, and a second anionic colloid at a pH such that coacervation does not occur;
   (b) acidifying the emulsion from step (a) to a pH such as to induce coacervation of the gelatin with the CMC and the second anionic colloid, with resultant deposition of liquid coacervate about the emulsified droplets of hydrophobic oil;
   (c) chilling the acidified emulsion from step (b) so as to solidify the liquid coacervate and form solid-walled microcapsules each containing one or more droplets of hydrophobic oil; and
   (d) cross-linking the solid microcapsule walls by means of a chemical cross-linking or hardening agent so as to render the microcapsule walls permanent;

characterized in that the CMC used has a viscosity in the range of from 50 to 140 mPas (cps), when measured in 6.0% by weight aqueous solution at 20° C. using a Brookfield RVT viscometer, Spindle No. 1, at 10 r.p.m., and in that the weight ratio of gelatin:CMC is from 1:0.14 to 1:0.05.

2. A process as claimed in claim 1 wherein the second anionic colloid is a maleic anhydride copolymer.

3. A process as claimed in claim 2 wherein the second anionic colloid is polyvinylmethylether/maleic anhydride copolymer (PVMMA).

4. A process as claimed in claim 2 wherein the second anionic colloid is ethylene/maleic anhydride copolymer (EMA).

5. A process as claimed in claim 1 wherein the weight ratio of gelatin:CMC is from 1:0.14 to 1:0.06.

6. A process as claimed in claim 1 wherein the weight ratio of gelatin:CMC is about 1:0.07.

7. A process as claimed in claim 1 wherein the CMC used has a viscosity in the range of from 90 to 130 mPas when measured under the conditions defined in claim 1.

8. A process as claimed in claim 7 wherein the bloom strength of the gelatin is about 160.

* * * * *